Oct. 17, 1967 J. D. HOPKINS ETAL 3,347,967

MANUFACTURE OF FILTERS

Filed March 25, 1963 11 Sheets-Sheet 1

INVENTORS.
John D. Hopkins
David J. Whittingham
Frederick H. Bultman
Paul K. Krause
BY Harness, Dickey & Pierce
ATTORNEYS.

Oct. 17, 1967 J. D. HOPKINS ET AL 3,347,967

MANUFACTURE OF FILTERS

Filed March 25, 1963 11 Sheets-Sheet 2

INVENTORS
John D. Hopkins.
David J. Whittingham.
Frederick H. Bultman
Paul K. Krause
BY Harness, Dickey & Pierce.
ATTORNEYS.

INVENTORS
John D. Hopkins
David J. Whittingham
Frederick H. Bultman
Paul K. Krause
BY Barnes, Dickey & Pierce
ATTORNEYS INVENTORS.
John D. Hopkins
David J. Whittingham
Frederick H. Buttman
Paul K. Krause
BY Harness, Dickey & Pierce
ATTORNEYS

MANUFACTURE OF FILTERS

Filed March 25, 1963

INVENTORS.
John D. Hopkins
David J. Whittingham
Frederick H. Bultman
Paul K. Krause
BY Harness, Dickey & Pierce
ATTORNEYS.

INVENTORS.
John D. Hopkins
David J. Whittingham
Frederick H. Bultman
Paul K. Krause
BY Harness, Dickey & Pierce.
ATTORNEYS.

Oct. 17, 1967 J. D. HOPKINS ETAL 3,347,967

MANUFACTURE OF FILTERS

Filed March 25, 1963 11 Sheets-Sheet 7

INVENTORS

John D. Hopkins

David J. Whittingham

Frederick H. Bultman

Paul K. Krause

BY Darnes, Dickey & Pierce

ATTORNEYS.

INVENTORS
John D. Hopkins
David J. Whittingham
Frederick H. Bultman
Paul K. Krause
BY Darness, Dickey & Pierce.
ATTORNEYS.

INVENTORS
John D. Hopkins
David J. Whittingham
Frederick H. Bultman
Paul K. Krause
BY Harness, Dickey & Pierce
ATTORNEYS INVENTORS.
John D. Hopkins
David J. Whittingham
Frederick H. Bultman
Paul K. Krause
BY Jarnes, Dickey & Pierce.
ATTORNEYS.

Oct. 17, 1967 J. D. HOPKINS ET AL 3,347,967

MANUFACTURE OF FILTERS

Filed March 25, 1963 11 Sheets-Sheet 11

INVENTORS.
John D. Hopkins
David J. Whittingham
Frederick H. Bultman
Paul K. Krause
BY Harness, Dickey & Pierce
ATTORNEYS.

United States Patent Office 3,347,967

Patented Oct. 17, 1967

3,347,967
MANUFACTURE OF FILTERS

John D. Hopkins and David J. Whittingham, Franksville, and Frederick H. Bultman, Racine, Wis., and Paul K. Krause, Arlington Heights, Ill., assignors to Walker Manufacturing Company, Racine, Wis., a corporation of Delaware Filed Mar. 25, 1963, Ser. No. 267,487
27 Claims. (Cl. 264—115)

This invention relates to the manufacture of filters, and more particularly to an apparatus and method for forming rigidized bodies of compressed fibers for use as elements in automotive oil filters or the like.

It is an object to provide an improved molding method and means for manufacturing circular rigidized bodies of compressed fibers in which the fibers will have an even circumferential distribution, thus creating a body of uniform density suitable for use as a filter element and which will minimize the possibility of areas of lesser or greater density which could detract from the filter effectiveness.

It is another object to provide an improved molding method and apparatus of the above character which is especially adapted for use with impregnated fibers, and which will cause compression of the fibers to the final body size in such a manner as to prevent the danger of over-compression which might undesirably alter the impregnated fiber characteristics.

It is a further object to provide an improved molding method and apparatus of this nature which is especially adapted for high quantity manufacture, and which is capable of mass producing the compressed fiber bodies with a high degree of uniformity and quality.

Other objects, features, and advantages of the present invention will become apparent from the subsequent description, taken in conjunction with the accompanying drawings, in which:

FIGURE 9 is a top plan view of a pair of molds showing the mounting means for their covers;

FIGURE 13 is a view similar to FIGURES 10, 11 and 12 but taken along the line marked "Sta. 5" and showing the actuating means for the cover lock pusher, as well as the mold ram actuating pistons for compressing the buns and the cover hold-down pistons.

Briefly, the illustrated embodiment of the invention utilizes synthetic fibers which have been impregnated with a water-resistant resin for the purpose of making an annular molded filter element, hereinafter sometimes referred to as a "bun." After drying the impregnated fibers, they are broken up into small clumps which are blown into a relatively long vertically disposed premold cylinder in such a way as to create a swirling effect toward a section of the cylinder having a plurality of small apertures distributed over its entire effective area. The cylinder is provided with a central core, an annular piston being reciprocable in the space between the core and cylinder. The fibers are blown in tangentially with respect to the cylinder, so that the swirling effect and the distributed openings will evenly distribute the fibers in a circumferential direction, the total apertured area being sufficient to permit free escape of the air entraining the fibers.

The fibers are then compressed downwardly by the piston into an annular mold disposed below the premold cylinder, the fibers being pressed against an annular ram within the mold which is held stationary at this time. This will partially compress the fibers. A metal end cap is then placed in the mold and a cover locked thereover, the premold ram having been withdrawn. The mold ram is then forced upwardly and locked in position, compressing the bun to its final size. The bun is held in the mold and subjected to heat for a predetermined period, after which the cover is opened and the rigidized bun is ejected by forcing the mold ram further upwardly. The bun is then placed in a final curing oven.

In the illustrated embodiment, four premold cylinders are shown and the molds are mounted in pairs on a turntable alternately in inner and outer rows, the turntable being indexed so that two premold cylinders may be charged at a time while the fibers in the other two premold cylinders are simultaneously being forced into a pair of molds. The illustrated embodiment also includes means for breaking up or "opening" each charge of impregnated fibers into small clumps before entering the premold cylinder charging ducts.

The mold rams are used both for compressing the buns to final size and ejecting them from the mold after the heating portion of the cycle, ram latch means being provided which permits automatic retraction of the rams after ejection. The covers for each pair of molds are actuatable by rack-and-pinion means mounted above the turntable, and the covers are individually adjustable to equalize their closing forces.

Figure 1:
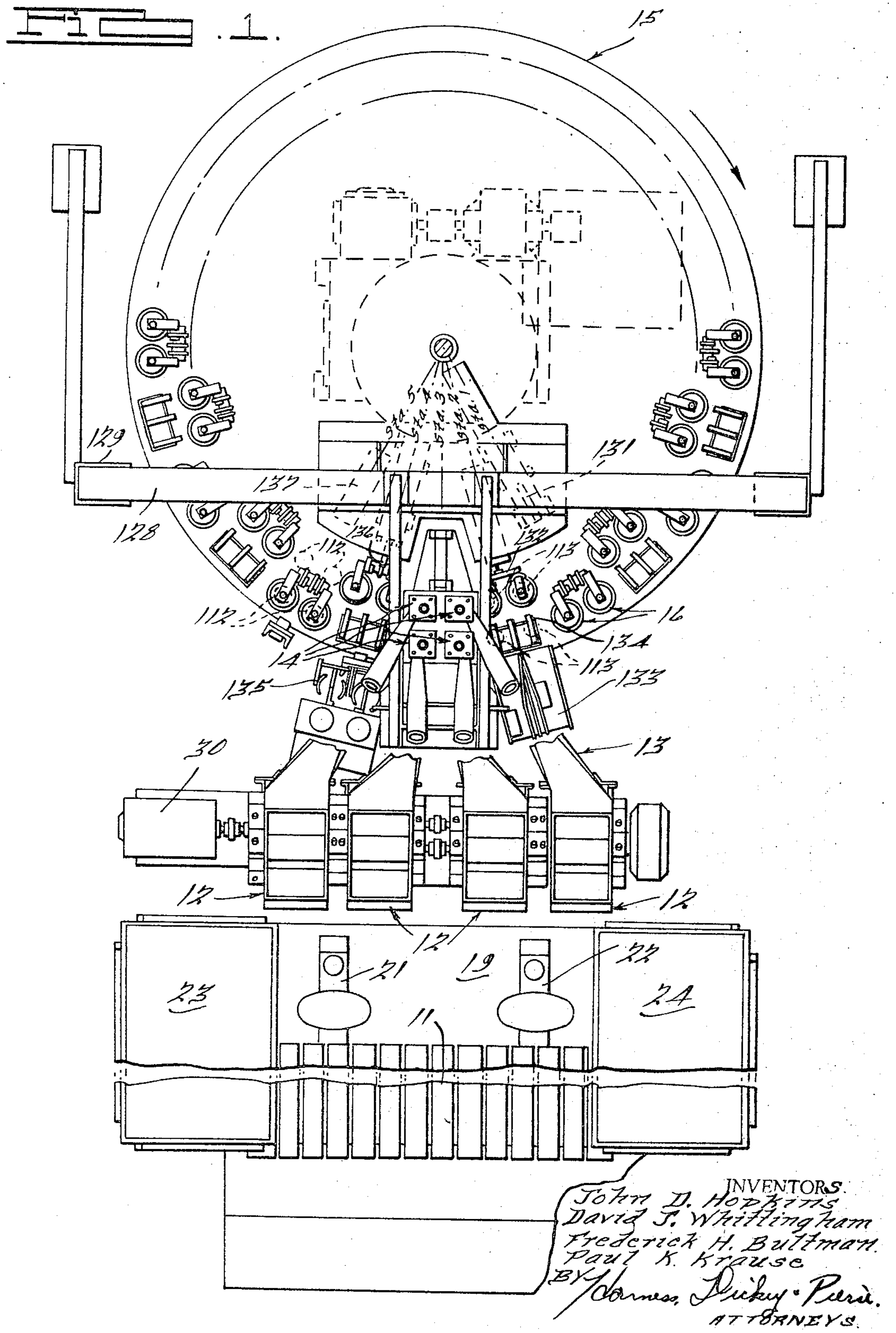
FIGURE 1 is a top plan view of a suitable embodiment of the invention incorporated in a turntable-type molding machine and showing the charge feeding and premold apparatus as well as the turntable, parts being omitted for clarity.
Figure 2:
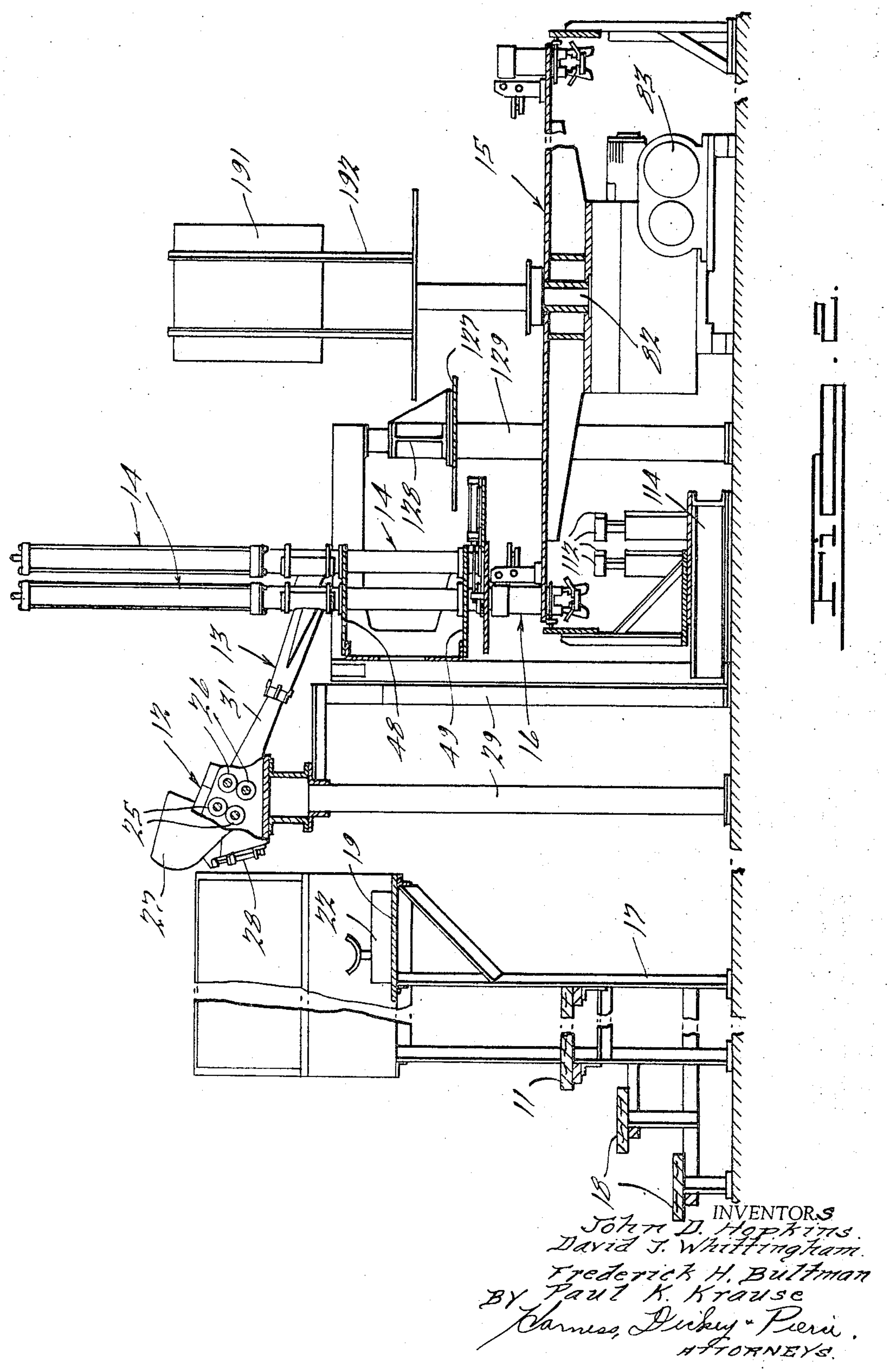
FIGURE 2 is a side elevational view of the apparatus shown in FIGURE 1.

Referring more particularly to the drawings, the general layout of the apparatus is shown in FIGURES 1 and 2 and comprises a loading platform 11, opening rollers generally indicated at 12, premold cylinder charging ducts generally indicated at 13, premold cylinders generally indicated at 14, and a turntable assembly generally indicated at 15, the turntable assembly carrying a plurality of circumferentially spaced molds generally indicated at 16.

Platform 11 is supported in an elevated position by a frame 17 provided with steps 18, frame 17 also supporting a scale platform 19 holding scales 21 and 22. A pair of fiber storage bins 23 and 24 are located on the sides of scale platform 19, so that an operator may take small clumps of fiber material therefrom, weigh out the proper amount for a single charge on scale 21 or 22, and feed it into opening rollers 12.

Four sets of opening rollers 12 are shown, each set comprising a pair of entrance rollers 25 and a pair of exit rollers 26. Each pair of rollers has coverings of frictional material closely spaced so as to grip a charge of fibers fed therebetween. A chute 27 is provided above each set of rollers 25 for receiving the charge of fibers; chute 27 is reciprocable by a fluid motor 28 to feed each charge into the rollers.

The upper roller of each pair 25 and 26 rotates in a counterclockwise direction whereas the lower roller rotates at the same speed as its upper roller but in a clockwise direction. The speed of rollers 26 is substantially greater than that of rollers 25; for example, rollers 25 could rotate at 90 r.p.m. and rollers 26 at 1800 r.p.m. Rollers 26 are spaced from rollers 25. When a charge of fibers is fed between rollers 25, and then enters rollers 26, the latter pair of rollers will pull and tear the charge into small clumps which enter ducts 13. Rollers 12 are supported by a frame 29 which also carries a motor 30 for driving the rollers.

Four ducts 13 lead from rollers 26 to four premold cylinders 14. Each duct 13 has a substantially rectangular cross-sectional shape at the exit of rollers 26, changing gradually to a circular cross-sectional shape at an intermediate portion 31 of duct 13 and to an elliptical cross-sectional shape at the exit 32 of the duct which is connected with cylinder 14.

Figure 4:
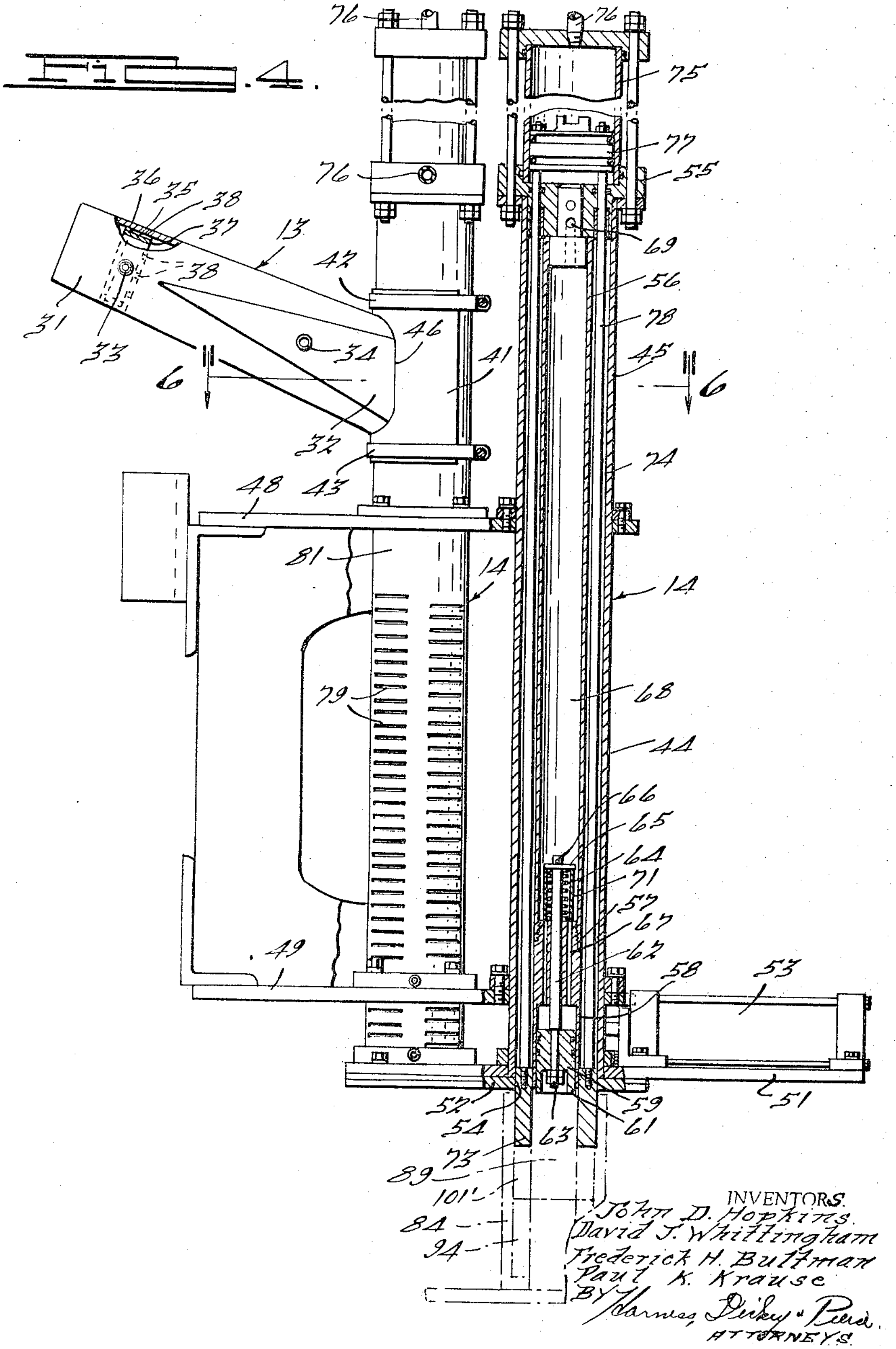
FIGURE 4 is a side elevational view, partly in cross section, of the premold cylinders, the view being taken in the direction of the arrow 4 of FIGURE 3 but with the partial section along the line 4—4 of FIGURE 3.

Means are provided in each duct 13 for entraining the fiber clumps in air and carrying them through the duct as loose air-entrained fibers. This means comprises compressed air connections 33 and 34 at portions 31 and 32, respectively, of each duct. Connection 33 leads to a ring 35 of generally flat channel-shaped cross-section, as seen in FIGURE 4, this ring being disposed within portion 31 of the duct. One end 36 of the ring extends toward and is secured to the inner duct surface, while the other end 37 likewise extends to the inner duct surface but is provided with a plurality of circumferentially spaced slots 38 so that compressed air in the annular space between ring 35 and duct portion 31 will be emitted in a forward direction and at high velocity. This will cause an eductive effect at the duct entrance and will blow the fibers drawn through ring 35 toward duct exit 32. Compressed air connection 34 leads to a nozzle 39 within portion 32 of duct 13 pointing toward the duct exit.

Figure 3:
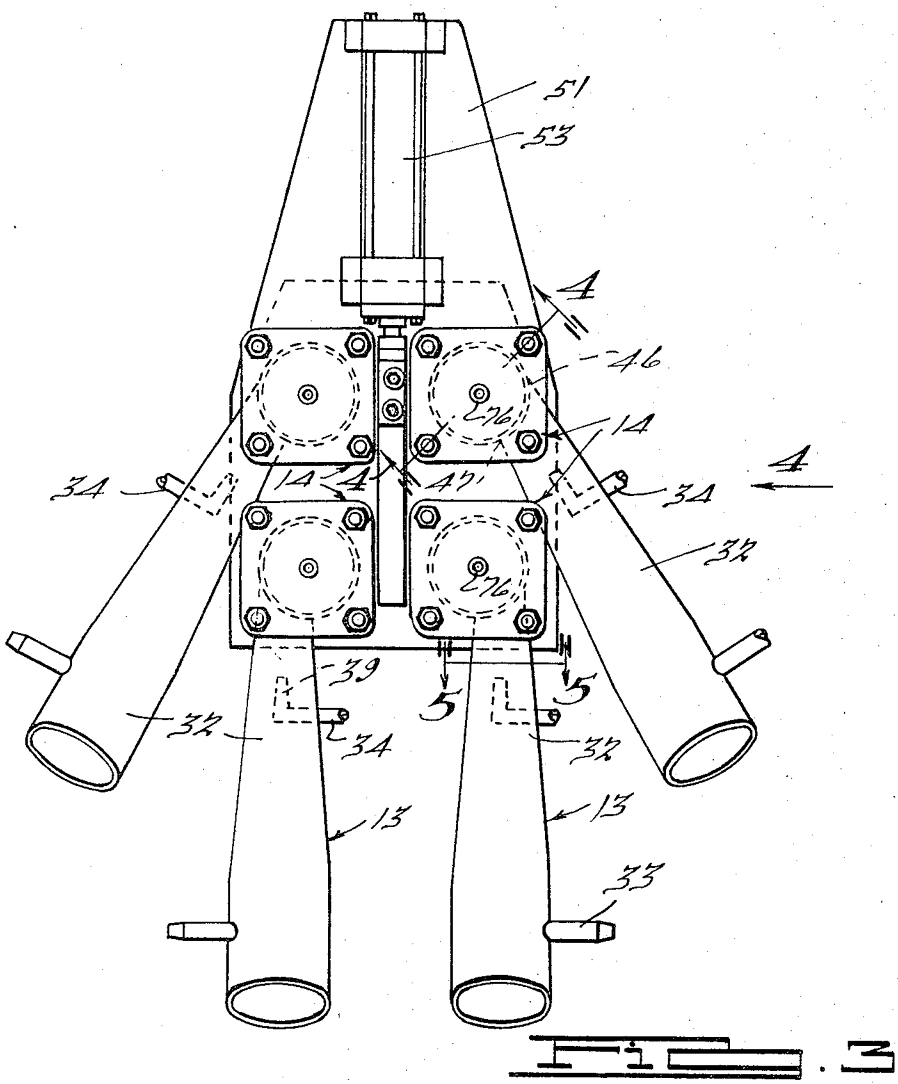
FIGURE 3 is an enlarged fragmentary top plan view of the premold cylinders and the adjacent portions of the feeding chutes.
Figure 5:
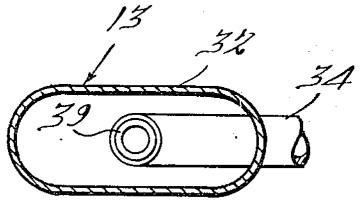
FIGURE 5 is a cross-sectional view taken along the line 5—5 of FIGURE 3 and showing the cross-sectional shape of the exit portion of a chute.
Figure 7:
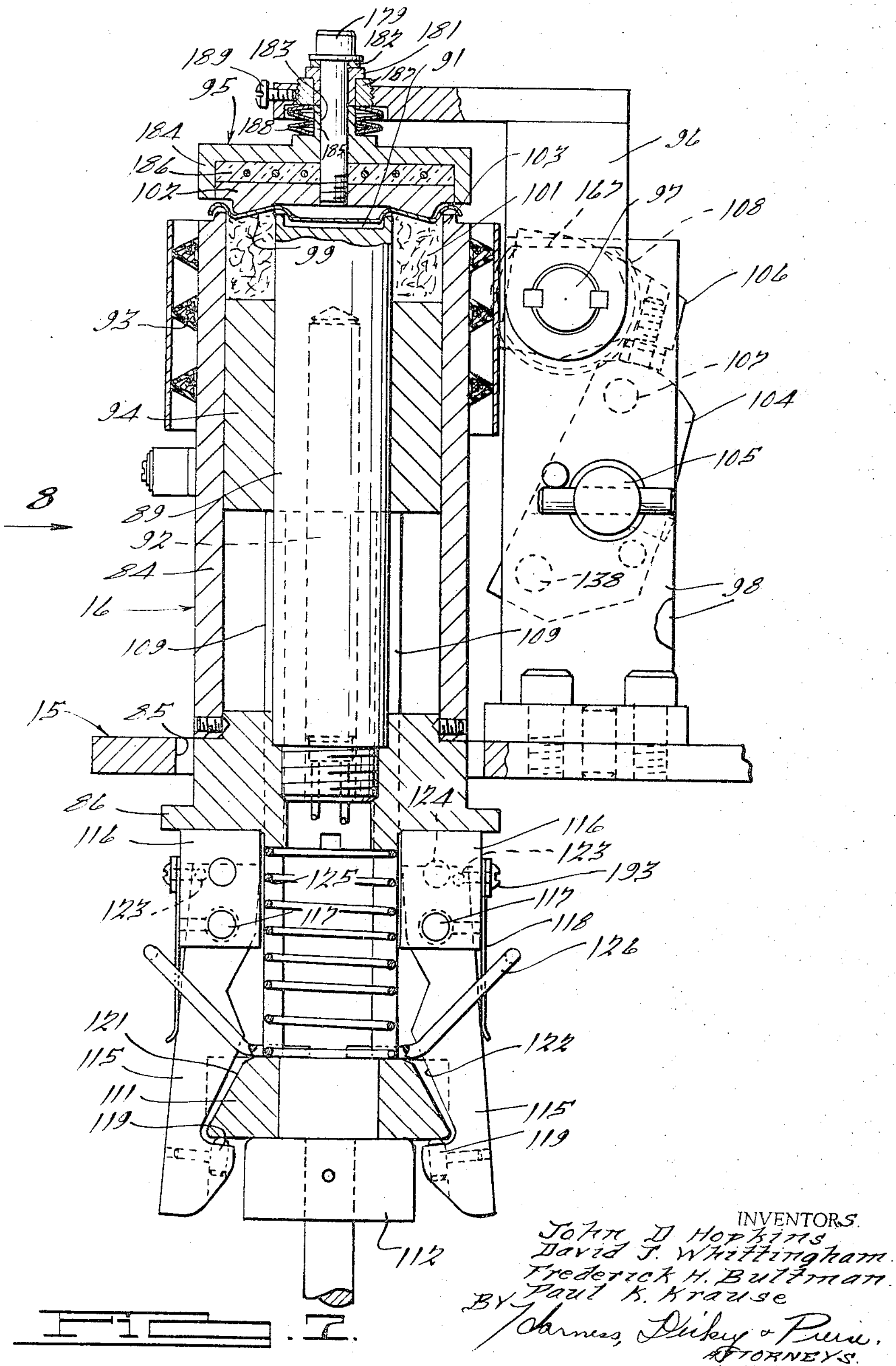
FIGURE 7 is an enlarged cross-sectional view in elevation of a mold and its attendant components.

A partially cylindrical plate 41 is secured to the exit end of each duct 13, and a pair of straps 42 and 43 secure plate 41 to cylinder 14. The relative positions of duct exit portion 32 and cylinder 14 are important in carrying out the invention. As seen in FIGURES 3 and 4, each cylinder 14 comprises a lower or slotted section 44 and an upper or solid section 45, plate 41 being secured to the upper section. Each exit portion 32 is downwardly inclined at an angle of about 25° at its connection with cylinder portion 45. As indicated above, the cross-sectional shape of exit portion 32 is somewhat elliptical, being elongated in a vertical direction, and a corresponding aperture is formed in the cylinder section 45 which is in registry with the duct exit, plate 41 of course also being apertured, as seen in FIGURE 7. The end of exit portion 32 is also curved to conform to the curvature of cylinder section 45.

Figure 6:
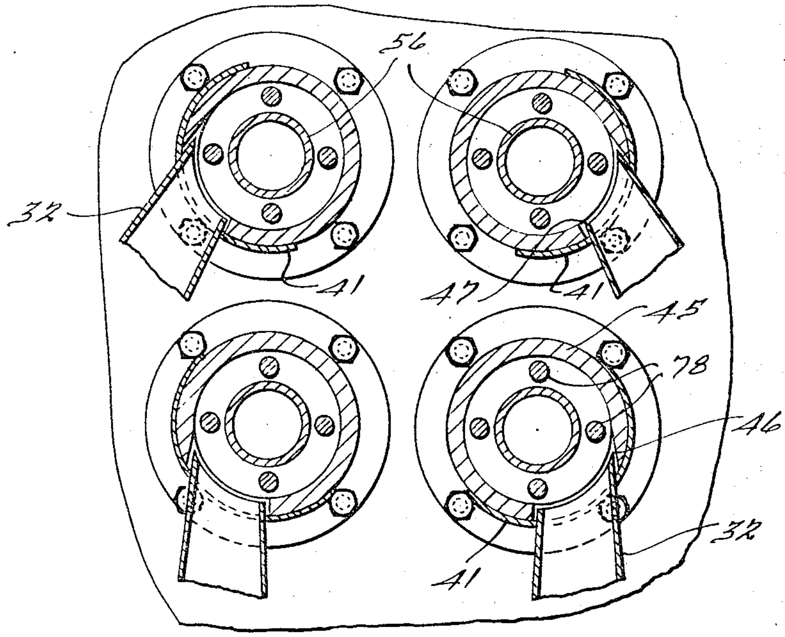
FIGURE 6 is a plan cross-sectional view taken along the line 6—6 of FIGURE 4 and showing the connections between the feeding chutes and the premold cylinders.

The manner of connecting exit portion 32 of each duct 13 with its corresponding premold cylinder section 45 is quite important in carrying out the invention, and is shown in FIGURES 3 and 6. The connection is such as to create a tangential flow which will be in a downwardly spiraling direction. For this purpose, the outer straight edge 46 of each duct exit portion 32 is substantially tangent to its corresponding cylinder 14 and the inner edge 47 is aligned with the axis of cylinder 14. With this arrangement, the fibers will tend to travel along on the inner surface of cylinder section 45, and will have sufficient tangential velocity to continue their downwardly spiraling path until they reach the slotted portion 44, described below.

The four premold cylinders 14 are rectangularly arranged as seen in FIGURE 1, so as to form an inner pair and an outer pair with respect to turnable 15. The cylinders are supported by vertically spaced horizontal plates 48 and 49 secured to frame 28, seen in FIGURE 4, and the lower ends extend through apertures in a stationary base plate 51 spaced below frame plate 49 but above molds 16 which pass under the premold cylinders. A plate 52 is mounted for sliding movement beneath plate 51, and a plate actuating cylinder 53 is mounted on an extension of plate 51 and serves to reciprocate plate 52. The latter has a pair of apertured portions 54 which, when plate 52 is in a position as shown in FIGURE 4, will be aligned with the inner pair of cylinders 14, plate 52 closing the bottoms of the outer pair. When plate 52 is moved to the left from its FIGURE 4 position (which, as will be later seen, is done when the rams within cylinders 14 are retracted), apertured portions 54 will be moved into registry with the outer pair of premold cylinders 14, closing off the bottoms of the inner pair.

A cylinder head 55 is secured to the upper end of each cylinder 14, and a fixed center core 56 is secured to a central downwardly projecting portion of head 55, core 56 extending down to a position slightly above the level of plate 49. Center core 56 is of tubular shape, and an aligning piston guide 57 is threaded into the bottom of core 56 and extends downwardly therefrom. A sleeve 58 projects downwardly from guide 57, and a piston 59 is slidably mounted in sleeve 58. A piston head 61 extends from piston 59 and a rod 62 extends through the piston and head and has a nut 63 threaded thereon. Rod 62 extends upwardly through the center of guide 57, and a helical compression spring 64 surrounds the upper end of rod 62. Rod 62, piston 59 and piston head 61 are normally urged upwardly from their FIGURE 4 position by spring 64, the latter engaging a washer 65 mounted under a cotter pin 66 on rod 62. A plurality of longitudinal passages 67 are provided in guide 57, and when the chamber 68 within core 56 is pressurized by application of pressure at a connection 69 in head 55, piston 59 and its connected parts will be urged downwardly against the action of spring 64, until washer 65 engages a sleeve 71 surrounding spring 64, this downward position being shown in FIGURE 4. The purpose of cylinder head 61 is to align mold 16 with premold cylinder 14, as will be later described. The aligning apparatus may, however, be omitted under certain circumstances.

A premold ram 73 is slidably mounted in the annular space 74 between each premold cylinder 14 and its core 56. Ram 73 is of elongated annular cylindrical shape and is movable between an upper position against head 55 and a lower position in which ram 73 projects partially downwardly from the underside of plate 52. A premold ram actuating cylinder 75 surmounts each head 55, this cylinder having pressure connections 76 at its opposite ends. An actuating piston 77 is slidably mounted in each cylinder 74 and carries four circumferentially spaced piston rods 78 extending through head 55 and secured to the upper end of piston 73.

As indicated above, each premold cylinder 14 has a lower perforated or apertured section 44 and an upper solid section 45. In the illustrated embodiment, section 44, which occupies about half the total length of the cylinder, has four vertical rows of narrow horizontally extending slots 79, although slots 79 could be staggered in a circumferential direction if desired. Each slot is shown as being substantially longer than the distance between slots, and is sufficiently narrow to prevent escape of an appreciable number of fibers, while permitting free escape of air. Only relatively narrow vertical bands of cylinder section 44 will remain unslotted, so that air will escape with uniform velocity around the entire periphery of section 44, it being kept in mind that since section 44 is spaced a substantial distance below the connection of cylinder 14 with duct 13, the air pressure will be substantially uniform in a circumferential direction throughout section 44.

The main purpose of the described construction of premold cylinder 15 is to obtain, to the greatest extent possible, a final molded article in which the fiber density distribution is uniform especially in a circumferential direction, the fibers themselves of course having a random orientation. Since the individual fibers will tend to be carried toward and build up against all slots 79, the fibers will be distributed with substantial uniformity in a circumferential direction before ram 73 descends. It has been found that the very narrow unslotted areas between the rows of slots 79 do not adversely affect this uniform circumferential distribution. The uniformity of distribution in an axial direction before compression is not considered as important as the uniform circumferential distribution. Shapes of air openings other than those of slots 79 could be used within the principles of the invention, bearing in mind the objects described above; slots have the advantage of being formable by relatively inexpensive machining methods.

The height of slotted section 44 must be sufficient to permit the presence of a total slot area which will prevent appreciable buildup of fibers between the upper end of slotted section 44 and the connection with duct 13. If such buildup occurs, the fibrous mass will eventually block entrance of fibers from duct 13 into cylinder 14. Preferably, the total area of slots 79 should be slightly greater than the annular cross-sectional area of the space between cylinder 14 and core 56, so that free flow of air will not be impeded. The unslotted section 81 of cylinder 14 between the connection with duct 13 and the upper end of slotted section 44 is also important in further insuring against such buildup of fibers as would block flow from duct 13 into the premold cylinder.

As indicated above, turntable 15 carries inner and outer circular rows of pairs of molds 16, the pairs being in staggered relation as seen in FIGURE 1, so that pairs will be alternately positioned under the inner and outer pairs of premold cylinders 14 as turntable 15 is indexed. The turntable is centrally supported at 82, as indicated in FIGURE 2, and is intermittently indexed in a clockwise direction as seen in FIGURE 1 by driving means 83, the angular distance of each indexing movement being equal to that between corresponding points on an inner and outer pair of molds 16.

Figure 8:
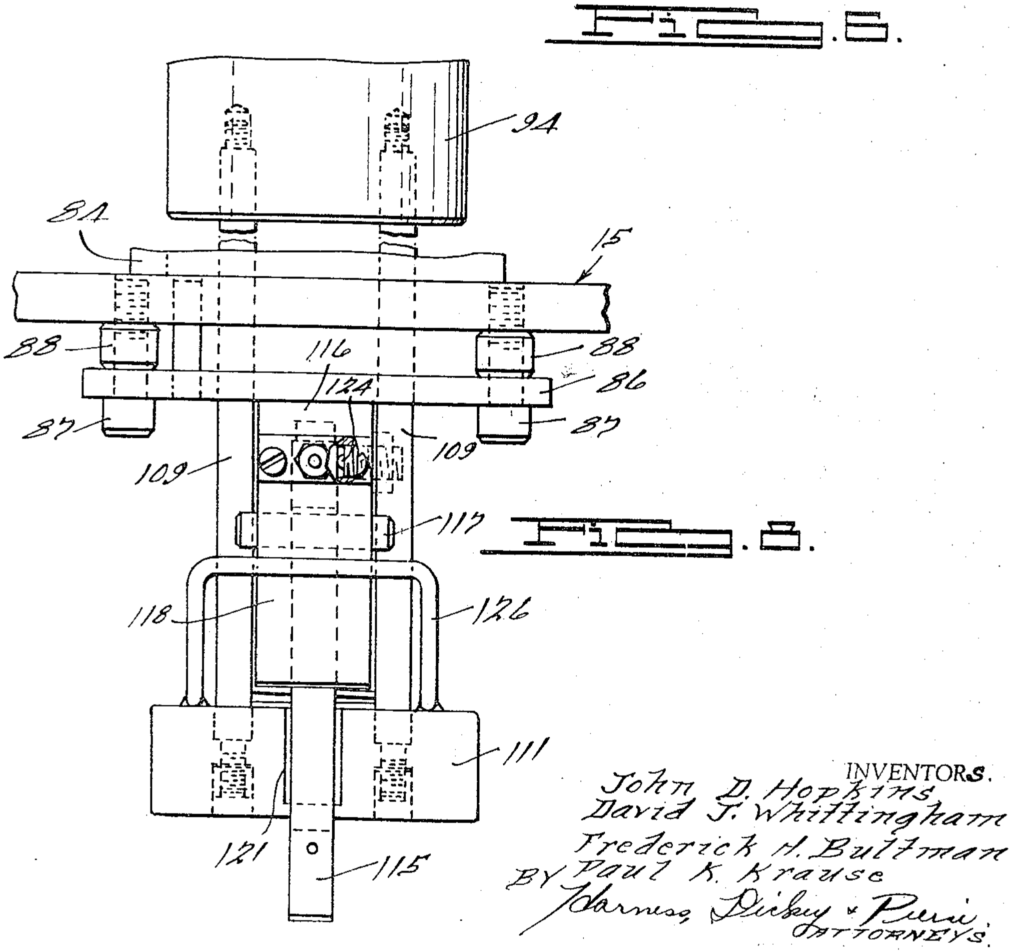
FIGURE 8 is an elevational view of the mold taken in the direction of the arrow 8 of FIGURE 7, parts being broken away.

Each mold 16 is constructed as shown in FIGURES 7, 8 and 9 and comprises a mold cylinder 84 extending through a circular aperture 85 in turntable 15 and having an internal diameter slightly greater than the internal diameter of a premold cylinder 14, this construction facilitating passage of the charge from the premold to the mold cylinder. The lower end of cylinder 84 has a flange 86 which is secured to turntable 15 by bolts 87 and spacers 88. A central core 89 of cylindrical shape is disposed within cylinder 84 and is secured to the inwardly extending lower end thereof, core 89 extending upwardly to about the level of the upper edge of cylinder 84. The diameter of core 89 is slightly less than the external diameter of premold core 56, again for the purpose of facilitating entry of the charge into the mold cylinder. Core 89 has an upper central recess 91 adapted to receive the lower end of aligning piston head 61 when the latter descends to its FIGURE 4 position. An inner heating element 92 is provided within core 89, and another heating element 93 surrounds the upper portion of mold cylinder 84.

An annular ram 94 is slidably mounted between cylinder 84 and core 89, this ram being movable from a lower position to a molding position shown in FIGURES 7 and 8 for holding the fibrous mass in a compacted condition while it is being heated by heating elements 92 and 93. A cover generally indicated at 95 is provided on mold 16, this cover being secured to an L-shaped member 96. Member 96 is fixed to a pivot pin 97 carried by a pair of upstanding brackets 98 on turntable 15 adjacent each pair of molds 16. Covers 95 are swung clockwise from their FIGURE 7 position to an open position when the fiber charges are being introduced into a pair of molds 16. In the illustrated embodiment, a sheet metal cap 99 is shown as being placed over the molded fibrous bun, the latter being indicated at 101 in FIGURE 7. Cap 99 is glued to bun 101 for use as an oil filter element in automotive vehicles. Cover 95 has an element 102 which is shaped to conform with an annular portion of cap 99 so as to hold the cap against lip 103 of mold cylinder 84. The remaining construction of cover 95 is described below in connection with its operation.

A locking cam 104 is provided for each pair of covers 95, this cam being pivoted at 105 to brackets 98 and cooperating with an arm 106 fixed to pivot pin 97. When cam 104 is swung counterclockwise from its FIGURE 7 position by engagement of an actuator described below with a pin 107 carried by the cam, arm 106 will be unlocked, permitting covers 95 to swing to their open position. A pinion 108 is fixed to pivot 97 and this pinion is actuated by movable racks positioned at the inner portion of turntable 15 for swinging the covers toward their open and closed positions, as later described.

Four circumferentially spaced rods 109 extend downwardly from ram 94 through the closed lower end of cylinder 84, and a head 111 is carried by the lower ends of these rods. Head 111 is adapted to be pushed upwardly to a mold ram actuating piston 112 or 113. There are four pistons 112 and four pistons 113 in two groups of four each, as seen in FIGURE 1. The pistons are carried by cylinders mounted on a portion 114 of frame 28, as seen in FIGURE 2, and are so positioned that the inner and outer pairs of molds 16 will alternately come into registry with two cylinders of each group. As will be later described, pistons 112 serve to move the mold rams from their retracted position to their mold position, as seen in FIGURE 7, while pistons 113 serve to move the rams from their mold position to an eject position for ejecting buns 101. In the eject position, the tops of the rams project slightly above the tops of the mold cylinders.

A pair of latches 115 is provided for holding each mold ram 94 in its mold position. These latches are pivoted to brackets 116 extending below mold cylinder 84 by pivots 117, and are urged inwardly by leaf springs 118. The latches have shoulders 119 which will engage the underside of head 111 as the head passes the shoulders; outer portions of the head slope downwardly and outwardly as shown at 121 in FIGURE 7 to cam latches 115 outwardly as the head is forced upwardly.

Each latch 115 has a cam surface 122 above its shoulder 119 which will be engaged by the corresponding surface 121 of head 111 when the head is forced upwardly to its eject position. This will cause outward swinging of the lower ends of latches 115 until recesses 123 carried by their upper ends engage ball-and-spring detents 124 carried by brackets 116, thus holding brackets 116 in such a position that shoulders 119 will not obstruct downward movement of head 111 when actuating pistons 113 are withdrawn. A helical compression spring 125 is provided between the underside of cylinder 84 and head 111, the spring urging head 111 and its connected parts downwardly. A pair of bails 126 are secured at their ends to the upper end of head 111 and extend outwardly of latches 115. The shape and position of these bails are such that after head 111 has passed shoulders 119 during its downward movement, bails 126 will cam latches 115 inwardly, disengaging them from detents 124, and readying them for the next mold stroke of the ram.

As indicated above, turntable 15 is periodically indexed an angular distance equal to that between like points on adjacent pairs of molds 16, and there are five operating stations, marked Station No. 1 through Station No. 5 in FIGURE 1, at which bun ejection, mold reloading and bun compression take place. The main operations which simultaneously occur at these stations are as follows:

Station No. 1: Unlocking and opening of a pair of covers 95.

Station No. 2: Ejection of buns 103 from mold cylinders 84 and stripping of the ejected buns from the turntable.

Station No. 3: Loading and partial compression of new charges of fibrous material in the two molds.

Station No. 4: Placing of end caps 99 on the molds and closing of covers 95.

Station No. 5: Locking of covers 95 and compression strokes of rams 94.

Between Station No. 5 and Station No. 1, the compressed bun is subject to heating as it travels around on the turntable.

FIGURES 1 and 2 show in partial or schematic form the apparatus used at the various stations. Some of this apparatus is carried by a mounting plate 127 supported beneath a beam 128, the beam being secured to uprights 129 on opposite sides of the turntable. A piston-actuated rack 131 is shown at Station No. 1, the outer end of this rack serving to engage pin 107 after which the upwardly facing rack teeth will engage pinion 108, so that cover 95 may be swung open after lock 104 is withdrawn. A piston-actuated stripper 132 with a pair of arcuate pushing elements is mounted at Station No. 2, the stripper being at a level such that it will engage the ejected buns 101 and push them off the turntable onto a chute 133. Raised guides 134 at the level of the ejected buns are provided for those molds 16 in the inner row, to support the buns being pushed from the mold onto chute 133. An end cap feeder 135 is provided opposite Station No. 4 for placing the end caps on the mold, and a piston-actuated rack 136 with downwardly facing teeth is also provided for engaging pinion 108 to close cover 95. A pusher 137 engageable with a pin 138 (FIG. 7) on lock 104 is provided at Station No. 5 for swinging lock 104 clockwise to lock cover 95 before pistons 112 are actuated.

Figures 10, 11:
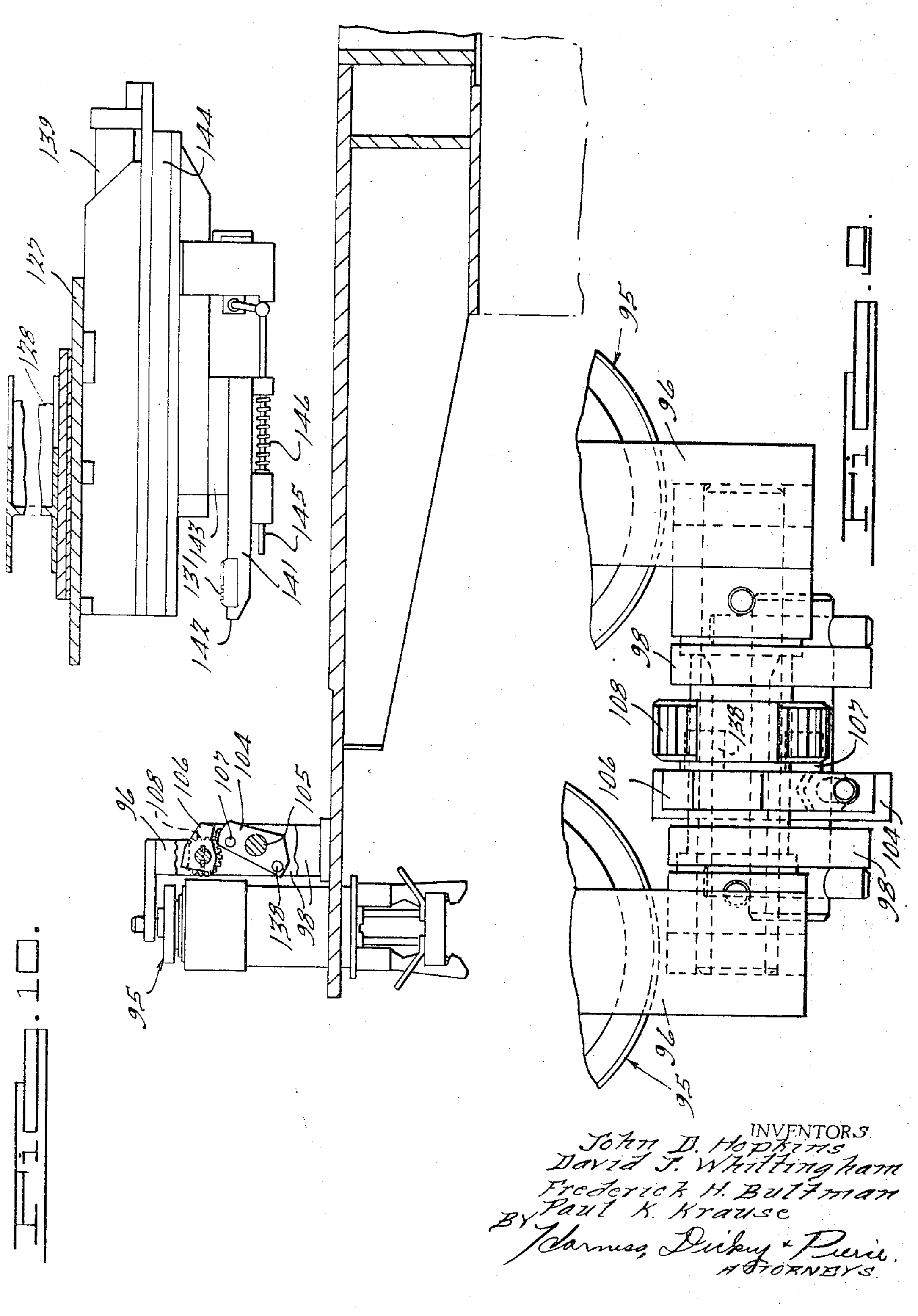
FIGURE 10 is a fragmentary cross-sectional view in elevation taken along the line marked "Sta. 1" of FIGURE 1, parts being omitted, and showing the cover opening means.
FIGURE 11 is a cross-sectional view in elevation similar to FIGURE 10 but taken along the line "Sta. 2" in FIGURE 1, and showing the location of the bun stripper with respect to the molds as well as the mold ram actuating pistons for ejecting the buns from the molds.
Figure 11:
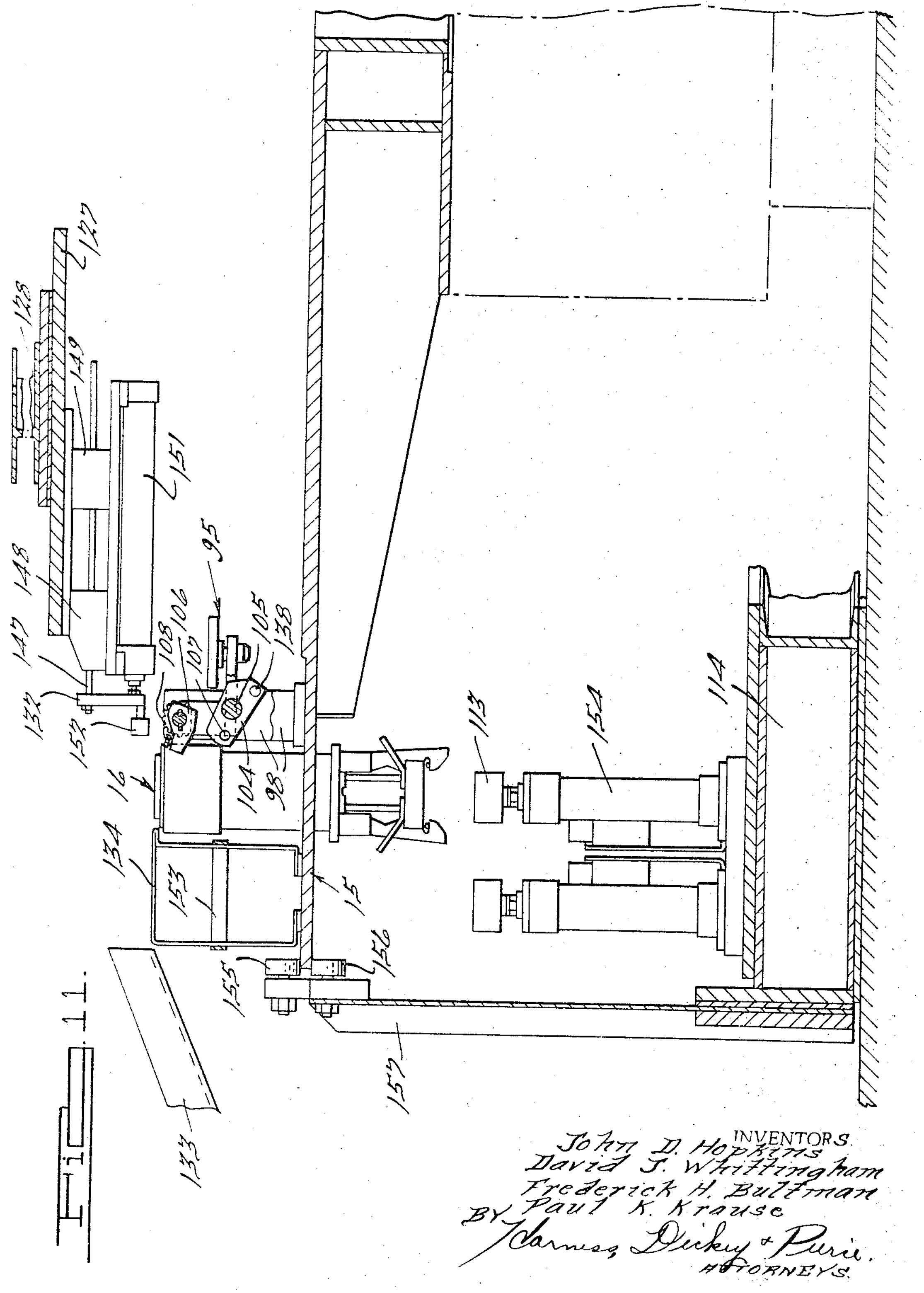

FIGURES 10 to 13 illustrate in greater detail the locations and actuating means for the elements at Station Nos. 1, 2, 4, and 5. Rack 131 is actuated by a double-acting cylinder motor 139 mounted below plate 127, and is carried at the outer end of a bar 141 having a flat nose 142 for engagement with pin 107. The length and position of rack 131 is such as to enable it to engage pinion 108 after cam 104 has been swung counterclockwise so as to swing covers 95 clockwise, rack 131 becoming disengaged from pinion 108 as covers 95 reach their open position as shown in FIGURE 11. An upward extension 143 on bar 141 is secured to the piston rod (not shown) extending leftwardly from cylinder 139 in FIGURE 10, and is also supported by horizontal tracks 144. A control rod 145 may be slidably mounted beneath bar 141 for engagement with pivot pin 105, rod 145 being urged by a helical compression spring 146 to the left as shown in FIGURE 10. Rod 145 could be used to control limit switches (not shown) which in turn control the supply of compressed air to motor 139. Other means could of course be used to control the limit switches.

Stripper 132, seen in FIGURE 11, is supported by a guide rod 147 which in turn is slidably mounted below plate 127 by spaced members 148 and 149. A double-acting cylinder motor 151 is mounted below members 148 and 149, its piston rod being connected to stripper 132. The arcuate pushing elements are indicated at 152 and extend leftwardly from stripper 132 as seen in FIGURE 11 at a level just above the tops of molds 16 when covers 95 are open.

Raised guides 134 are fabricated of parallel flat strips of inverted U-shape, their central portions being horizontal and at the level of the tops of inner molds 16 so that they will guide the buns onto chute 133. The lower ends of guides 134 are secured to turntable 15. A reinforcing strap 153 may be provided for the spaced straps comprising guides 134. The outer pairs of molds 16 will of course not have any bars 134, since they will be closely adjacent chute 133.

Pistons 113 are shown as extending upwardly from cylinders 154 which are mounted on portion 114 of frame 28. For purposes of clarity, only one inner and one outer cylinder 154 shown in FIGURE 11, although there are actually two inner and two outer cylinders. The outer edge of the turntable in the vicinity of cylinder 154 is disposed between a pair of rollers 155 and 156 carried by a post 157 attached to frame portion 114.

Rack 136 at Station No. 4 is mounted at the outer end of a bar 158 which is slidably carried by spaced bearings 159 and 161. These bearings are secured below a plate 162 which in turn is carried below a double-acting cylinder motor 163 mounted below plate 127. The piston of motor 163 is connected by a bracket 164 to bar 158. The bar may also be used to control limit switches such as those shown at 165 and 166.

Figures 12, 14:
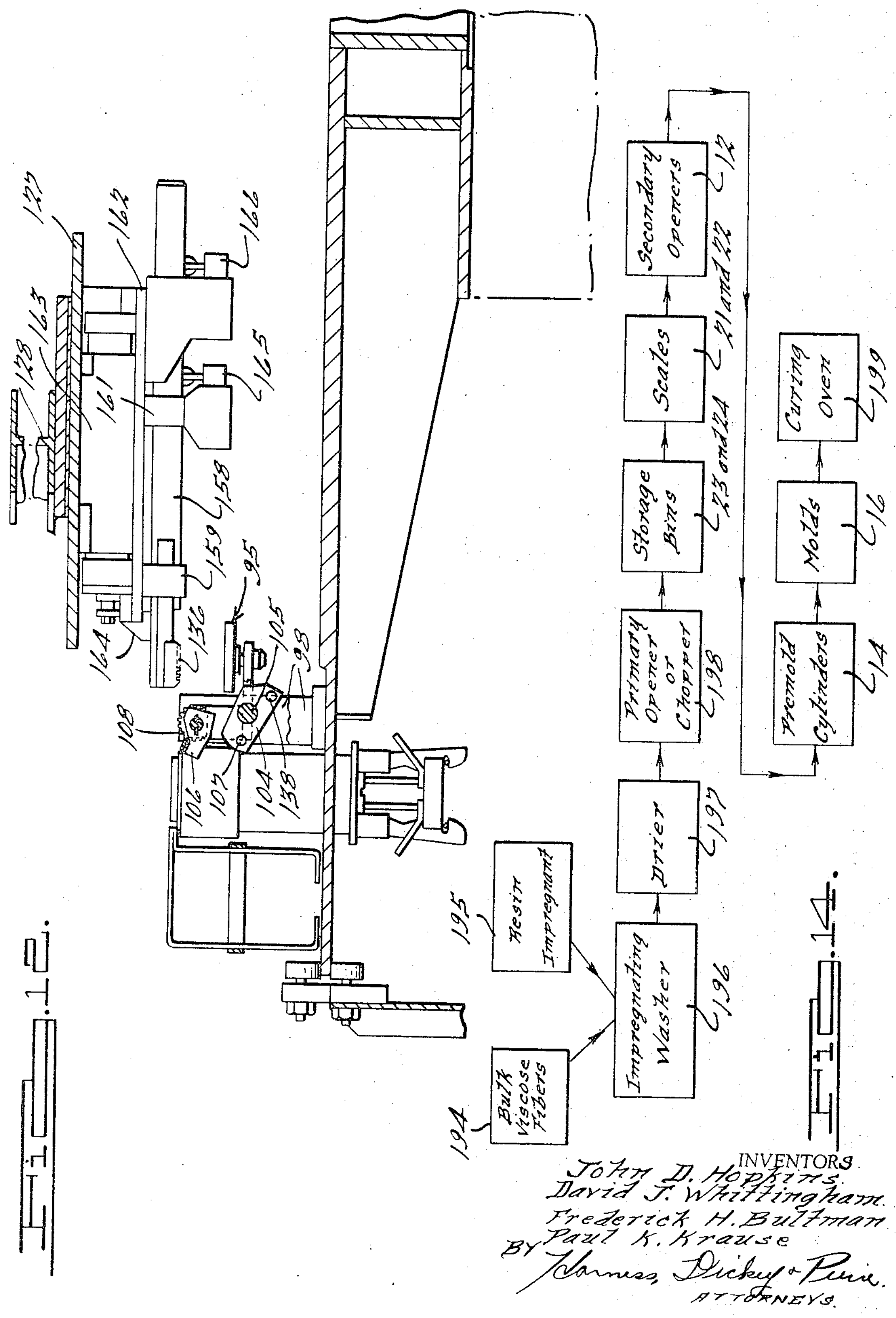
FIGURE 12 is a view similar to FIGURES 10 and 11 but taken along the line marked "Sta. 4" of FIGURE 1, and showing the cover closing means.
FIGURE 14 is a flow diagram showing steps in the process of this invention.
Figure 12:
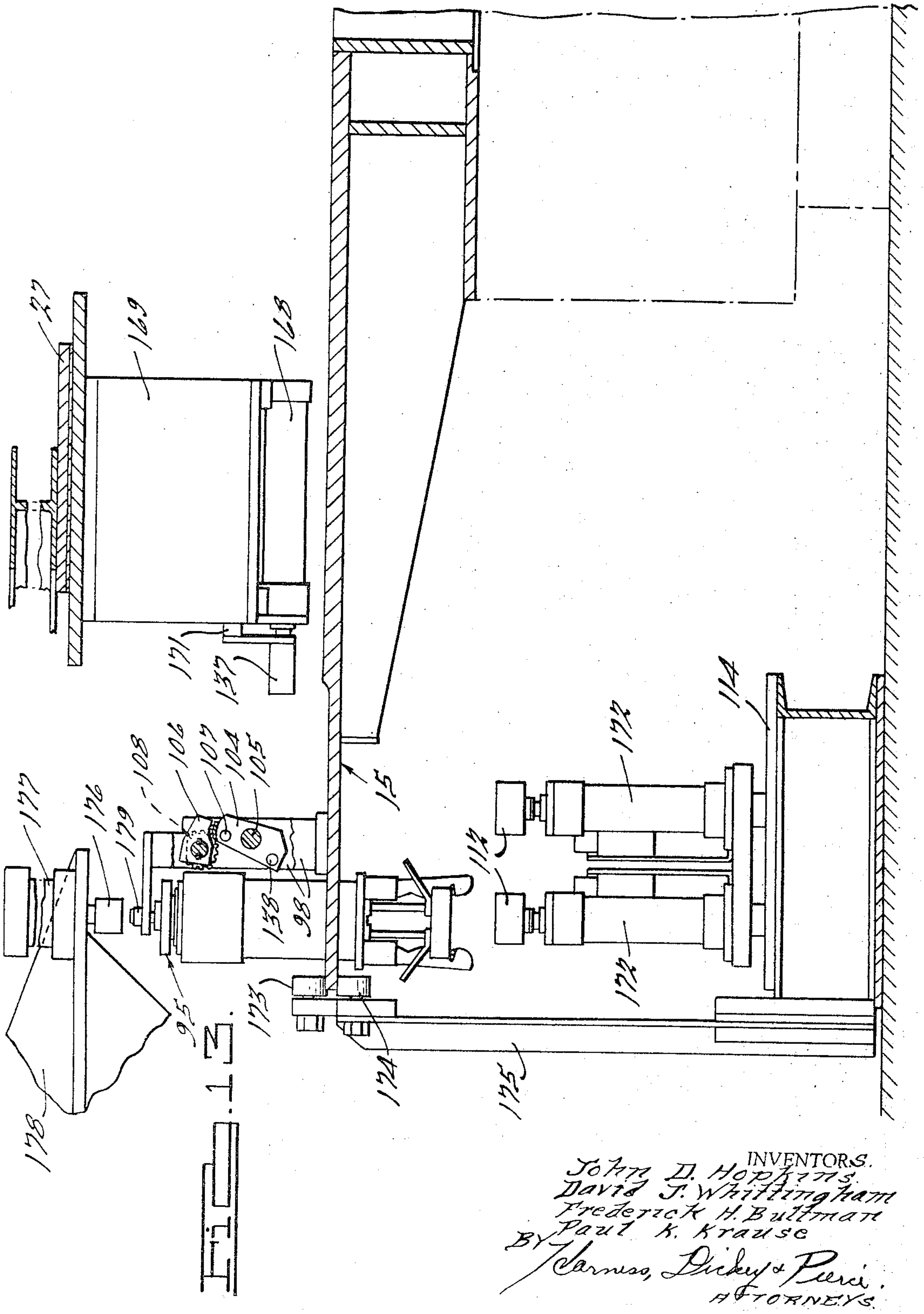
Figure 15:
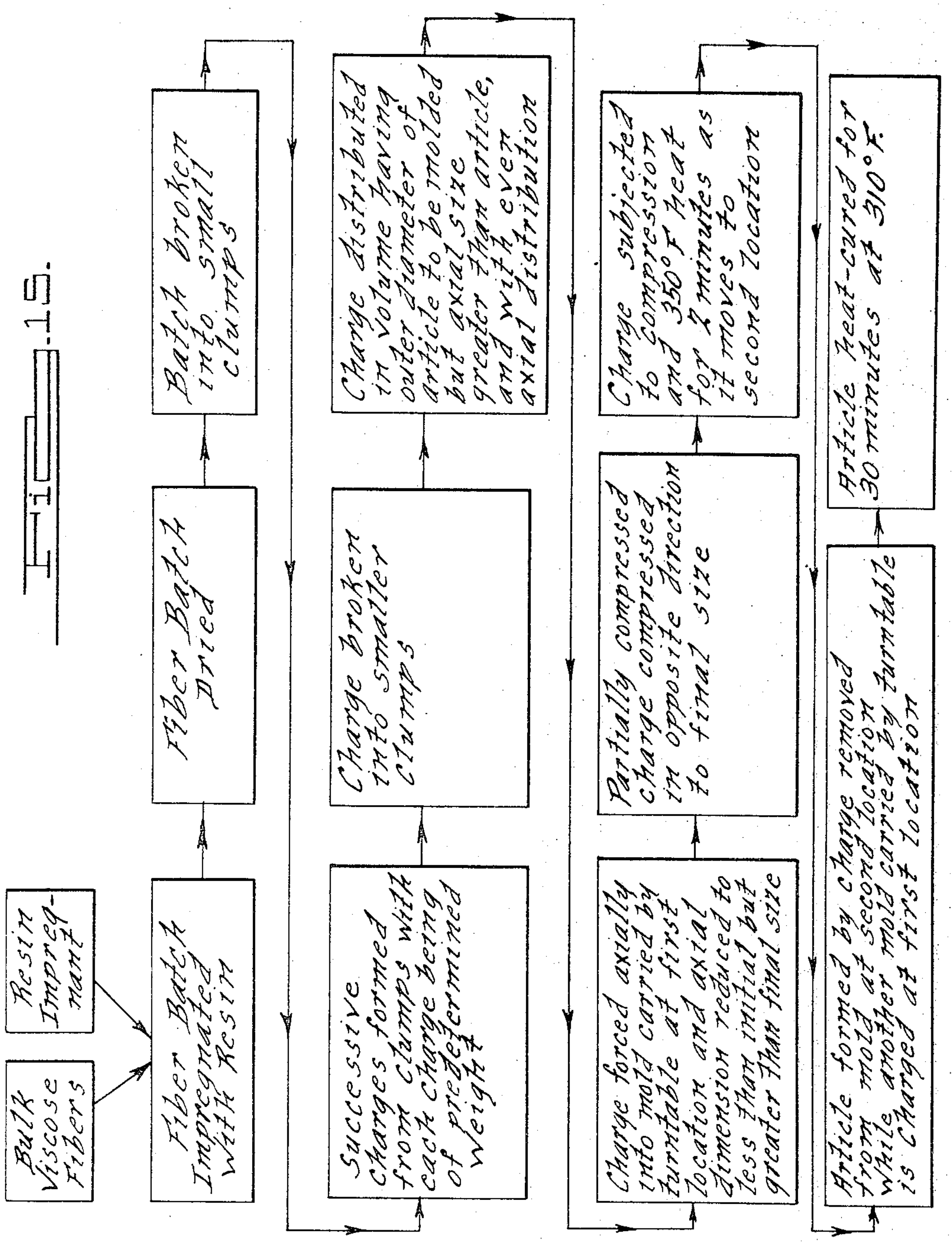
FIGURE 15 is an illustration of a method of making a fibrous article in accordance with the invention.

As in the case of rack 131, rack 136 is provided with sufficient teeth to rotate pinion 108 until covers 95 are swung from their open position shown in FIGURE 12 almost to a closed position, and thereafter disengage the pinion, the covers dropping into their closed position as seen in FIGURE 13. The portion of each pinion 108 which is at the top when covers 95 are closed and at the bottom when they are fully open is cut away, as indicated at 167 in FIGURE 7, so that racks 131 and 136 may be retracted without interference.

Pusher 137 is actuated by a double-acting cylinder motor 168, seen in FIGURE 13, this motor being suspended beneath plate 27 by a bracket 169 of sufficient height to align pusher 137 with pin 138, so that the pressure will swing cam lock 104 from its FIGURE 12 position to its FIGURE 13 position, locking covers 95 in their closed position. A cam bar 171 is secured to pusher 137 and is slidable within bracket 169 for actuating limit switches (not shown) mounted within the frame.

Pistons 112 are operated by cylinders 172 mounted on portion 114 of frame 28. In order to minimize deflection of turntable assembly 15 when pistons 112 are actuated upwardly, a pair of rollers 173 and 174 are engageable with the turntable rim, being supported by a post 175. To prevent any upward movement of covers 95 due to the upward forces exerted by pistons 112, four cover hold-down pistons 176 are provided, two for each pair of outer covers and two for each pair of inner covers 95 as they reach Station No. 5. One such piston is seen in FIGURE 13. Pistons 176 are carried by double-acting cylinder motors 177 mounted on a cantilever type frame 178 extending over Station No. 5. Controls (not shown) are provided which are interconnected with pistons 112 so that hold-down pistons 176 will engage the tops of bolts 179 above covers 95 just as pistons 112 compress buns 101 through mold rams 94. After pistons 112 finish their compressing stroke and being to descend, pistons 176 will also be retracted.

Each bolt 179 (FIGURE 7) carries a shouldered bushing 181 beneath its head and separated therefrom by a washer 182. The bolt extends through a smooth bore 183 in outer member 184 of cover 95 and is threadably connected to inner member 102. Member 184 has a central upward extension 185 engageable with the underside of bushing 181, and an electric heating element 186 is disposed between cover members 102 and 184. Tightening of bolt 179 in member 102 will therefore draw together members 102 and 184, forming a rigid cover assembly 95 comprising bolt 179, washer 182, bushing 181, outer cover member 184, heater 186 and inner cover member 102.

Means are provided for adjustably mounting each of these cover assemblies 95 on its arm 96, so that both covers in each pair will be held by cam lock 104 with approximately the same force against caps 99. This means comprises an adjusting bushing 187 threadably mounted in arm 96 and surrounding the main portion of bushing 181, being in engagement with the underside of its shoulder. Spring means 188 comprising a stack of Belleville type washers surrounds extension 185 of outer cover member 184 and is disposed between this cover member and the underside of bushing 187. A set screw 189 is provided for holding bushing 187 in its adjusted position. It will thus be seen that the height of cover 95 relative to arm 96 may be adjusted so that when each pair of arms 96 are in their full locking position, as controlled by the cam surface on lock 104 and its angular position as set by pusher 137, spring means 188 will have undergone a predetermined amount of compression, the shoulder of bushing 181 being slightly lifted away from the top of bushing 187. The hold-down force exerted by springs 188 on cover 95 may of course be supplemented by the above described pistons 176.

*Operation*

Operators standing on platform 11 will weigh charges of the impregnated and dried fibers on scales 21 and 22, and place them in chutes 27. After each indexing movement of turntable 15, the operators will cause two of the chutes 27 to be pivoted by means of fluid motors 28 to feed their respective fiber charges into opening rollers 12. Opening rollers 12 will tear the charge into small clumps and feed them into ducts 13 from which they will be blown to premold cylinders 14.

Each pair of premold cylinders 14, that is, the inner pair and the outer pair, will be alternately charged with fibers, the charging taking place while the charges in the other pair are being forced into their respective molds 16. It this way, the time between indexing motions is greatly reduced, since each charge of fibers will be in readiness for loading as soon as its mold reaches Station No. 3. In other words, with a pair of inner molds 16 at Station No. 3, as shown in FIGURE 4, as the charges in the inner pair of premold cylinders 14 are forced into their respective molds 16, the outer pair of premold cylinders 14 (on the left hand side as shown in FIGURE 4) will be closed by plate 52 and charged from their ducts 13.

As indicated above, the fibers will be carried with appreciable velocity, due to the compressed air issuing from ring 35 and nozzle 39, and will move with a downward swirling motion into the space 74 between each cylinder 14 and its core 56. Air will escape through slots 79 and the fibers will be collected against the inner surface of cylinder section 44 in such manner as to be equally distributed in a circumferential direction.

The pair of permold cylinders 14 which are being charged will also be aligned with their corresponding molds 16 by downward actuation of pistons 59, piston heads 61 entering recesses 91. Release of pressure on pistons 59 after charging will permit retraction of the pistons by springs 64.

Downward actuation of pistons 77 will cause rams 73 to push the charges of the fibers into the spaces between cylinders 84 and cores 89, it being kept in mind that at this time rams 94 will be in their lowermost position. Pistons 77 will then be retracted upwardly, retracting rams 73. Although some axial expansion of the fibers will take place when the rams are retracted, this expansion will not be sufficient to permit the uppermost fibers to rise above the top of molds 16. FIGURE 4 illustrates the depth to which each ram 73 descends. This figure shows a mold ram 94 in dot-dash lines in its retracted position, with the corresponding ram 73 in its ramming position. The reference number 101' indicates the size of the partially compressed bun, it being noted that the height of the bun is considerably greater than its final height as shown in FIGURE 7, but that its uppermost portion is well below the top of cylinder 84.

As mentioned above, the internal diameter of mold cylinder 84 is preferably slightly greater than that of premold cylinder 14, and the diameter of mold core 89 is slightly smaller than that of premold core 56. This will compensate for the tendency of the fiber charge to expand radially in both inward and outward directions as it passes the gap which necessarily exists between the underside of plate 52 and the top of each mold 16, and will insure complete entry of the charge into the mold. In fact, it has been found that this construction may eliminate the need for piston 59 and the other portions of the aligning mechanism, thus removing a possible source of operational problems.

After withdrawal of premold rams 73 to their uppermost positions in cylinders 14, turntable 15 will be indexed. At Station No. 4, end caps 99 will be placed on the molds by apparatus 135, and rack 136 will be advanced to close covers 95. Of course, the operations described with respect to all stations will take place at the same time after each indexing movement turntable 15. For example, the other two premold cylinders 14 will be charged in readiness for the next index step, while the premold cylinders which had been charged will now be opened and their charges forced into their respective molds 16.

At Station No. 5, cam lock 104 will be moved into its locking position as shown in FIGURE 7 by actuator 137, and ram actuating pistons 112 will then move heads 111 to their compressing position as shown in FIGURE 7, compressing buns 101 to their final size. Heads 111 will be held in position by latches 115. As pistons 112 move up, cover hold-down pistons 176 will move downwardly to hold covers 95 against deflection.

It should be noted that since the fibers which comprise bun 101 are initially compressed in one direction and are finally compressed in the opposite direction, bun 101 will tend to have equal distribution of fibers in a direction parallel to its central axis as well as in a circumferential direction, since both ends of the bun will have been engaged by moving rams to achieve the final size.

The buns will be maintained in a compressed and heated condition as they travel from Station No. 5 to Station No. 1. The temperature controls as well as the control mechanism for the other portions of the entire assembly may be mounted in a cabinet 191 carried by a frame 192 above the center of turntable 15.

At Station No. 1, rack 131 will advance to first rock cam 104 counterclockwise in FIGURE 7 to its unlocking position and then to swing covers 95 open by engagement with pinion 108. At Stanton No. 2, pistons 113 will rise to engage heads 111, moving them upwardly until they cam latches 115 outwardly a sufficient distance to cause the latches to be held by detents 124. At the same time, buns 101 will be ejected from mold cylinders 84, being held above the tops of the mold cylinders while stripper 132 pushes them onto chute 133. Retraction of pistons 113 will permit springs 125 to retract rams 94, bails 126 striking latches 115 after head 111 has passed shoulders 119 to dislodge latches 115 from detents 124 and permit springs 118 to return the latches to their FIGURE 7 position, in which they will be held by stops 193. The molds will then be ready for recharging after they advance to Station No. 3. The buns will be subjected to further heat treatment as described in the following example.

*Example of complete process*

The following is an example of a complete process utilizing the principles of this invention, used for the manufacture of second stage automotive oil filter element such as that described and claimed in copending patent application, Ser. No. 185,661 filed Apr. 6, 1962, by Louis F. Niebergall and James C. McLaren and entitled Filter, which application is assigned to the same assignee as the present application. The process is described with reference to FIGURE 14.

Bulk fiber-type viscose rayon 194 to 40 denier and 1 inch to 2 inch staple fiber lengths was impregnated with phenol formaldehyde resin 195 so that the resin formed a uniform coating on the fibers to make them waterproof as well as to act as a bonding agent for the fibers and give structural strength to the final product. The impregnation was carried out by loading laundry bags with small handfuls of fibers and placing the bags in a commercial type of washer 196 into which the resin was pumped, the washer having a relatively low speed spin step for impregnation followed by a relatively high speed spin step for extracting the excess impregnant. The impregnated fiber batches were then loaded into a dryer 197 heated by a steam coil with the air inlet temperature being between 200 and 220° F. and the outlet air temperature between 140 and 160° F.

After the fibers were thoroughly dry, they were determined to have picked up between 1.5 to 2 grams of resin for each 27 grams of impregnated rayon.

The dried impregnated fibers were then delivered to a primary opener or chopper 198, which consisted of a pair of closely spaced counter-rotating lawnmower type blades on a common horizontal axis. These blades rotated at a rapid rate and the fibers were blow through them in such a manner as to considerably reduce the clump size. The fibers were delivered from opener 198 to storage bins 23 and 24, and charges of between 26½ and 27 grams per bun were weighed out on scales 21 and 22.

The entrance roller 25 in each set of opening rollers 12, indicated as "secondary openers" in FIGURE 14 to distinguish them from primary opener 198, rotated at 90 r.p.m. and the exit rollers 26 at 1800 r.p.m. The charges then entered premold cylinders 14 and molds 16 in the manner described above. A thin ring of a thermosetting type adhesive was applied to the underside of each cap 99 just before being placed in mold 16.

In the present example, the internal diameter of each mold cylinder 84 was 3.180 inches and the external diameter of each mold core 89 was 1.686 inches. The free uncompressed height of each mold 16 was approximately 5 inches, and premold ram 73 compressed the fibers in mold 16 to a height of 4 inches, from which it sprang back to some extent upon retraction of the premold ram. After mold ram 94 moved upwardly to its mold position, bun 101 had a height of 1.125 inches.

The buns had a cure time in molds 16 of approximately two minutes. The mold temperature was maintained at the level required to cure bun 101 sufficiently to hold its correct size during the remainder of the process, namely, transport to and through a final curing oven 199. Although the temperature in the molds could be varied as necessitated by fiber moisture and resin pickup, in general it approximated 350° F. It was found more desirable to correct a variable resin content or fiber wetness rather than raise the mold temperature.

Upon ejection and stripping from molds 16, buns 101 had attained a light tan or straw color. The buns were then placed in a belt-type direct fired gas heat curing oven, and were cured for thirty minutes at 310° F. This completed the cure of the phenol formaldehyde resin.

Buns 101 fabricated by this process were found to meet specific requirements for acceptability as second stage automotive oil filter elements of the type described in the aforementioned copending application. Among these requirements were a complete and uniform resin cure quality without degradation of the filtering medium, uniform distribution and random orientation of the fibers without areas of dense concentration or voids, optimum air permeability within close limits, resistance to dead weight loads, and resistance to water.

While it will be apparent that the preferred embodiments of the invention disclosed is well calculated to fulfill the objects above stated, it will be appreciated that the invention is susceptible to modification, variation and change without departing from the proper scope or fair meaning of the subjoined claims.

What is claimed is:

1. In a method for forming fibrous articles in a circular mold, the steps of distributing a charge of resin coated fibers in a volume having an outer diameter approximating the final outer diameter of the final molded article but with an axial size substantially greater than that of the final molded article, the fibers having substantially even distribution in a circular direction, forcing the distributed fibers axially into the mold in one direction and reducing the axial dimension to a size substantially less than the initial size but still substantially greater than the final article size, compressing the partially compressed charge of fibers in the opposite direction to its final size, and curing the resin to bond the fibers together.

2. In a method for molding fibrous articles in a plurality of molds moving on an endless path, the steps of impregnating a batch of uniform diameter fibers with thermosetting resin, breaking up said batch into small clumps of fibers, forming successive charges of fibers from said clumps with each charge being of identical weight equal to that of one of said articles, placing said charges successively at a first location, successively moving molds to said first location and loading each charge into a mold as it arrives at said first location, successively moving said loaded molds to another location and subjecting said charges to compression and heat while in their respective molds as the molds move to said another location, and successively removing said charges from said molds when they arrive at said another location.

3. In a method for molding fibrous articles, the steps of coating a batch of viscose rayon fibers with thermosetting resin, weighing out a charge of said fibers from said batch sufficient to form one of said articles and placing said charge in a mold with substantially even distribution of fibers in a circumferential direction, subjecting said charge to compression and heat while in said mold so that said fibers will hold to the correct molded size after removal from the mold, and heat-curing the article after removal from the mold for approximately 30 minutes at a temperature of about 310° F.

4. In a method for forming fibrous articles, the steps of coating a batch of fibers with phenol formaldehyde resin, weighing out of said batch of fibers a charge of fibers sufficient to form one of said articles, placing said charge in a mold with substantially even distribution of fibers in a circumferential direction, subjecting said charge to compression while in said mold at a temperature of approximately 350° for about 2 minutes, removing the article formed by said fibers from the mold, and heat-curing the article for about 30 minutes at approximately 310° F. after removal from the mold.

5. In a method for forming fibrous articles in a plurality of circular molds moving on a turntable, the steps of wetting a batch of fibers with thermosetting resin, to coat said fibers with resin, forming a plurality of charges each of a weight sufficient to form one article, placing said charges successively at a first location adjacent the turntable and with a substantially even distribution of fibers in a circular direction, rotating said turntable and successively forcing each distributed charge axially into a mold as it arrives at said first location, rotating said turntable and subjecting said charges in said molds to compression and to heat of about 350° F. for about 2 minutes as they move to a second location, removing the articles formed by said charges from said molds as they arrive at said second location, and heat-curing said articles for about 30 minutes at approximately 350° F. after removal from said molds.

6. The method of manufacturing a circular rigidized compressed fibrous filter body or the like which comprises the steps of (1) uniformly coating a mass of fibers with a thermosetting resin, (2) opening up the fibrous mass by application of force to separate the fibers from each other, (3) weighing out a charge of coated fibers sufficient to form one body and entraining said charge of coated fibers in a jet of air and blowing the fibers substantially tangentially into a cylindrical mold along a swirling path to obtain a substantially uniform circumferential distribution of the fibers around the inside wall of the mold, (4) compressing the fibrous shape obtained in said mold from opposite longitudinal directions while confining it radially at a desired dimension to reduce the shape to the desired length, and (5) heating the shape in compressed condition to cure the resin and unite the fibers and form a rigidized body of desired diameter and length.

7. The method of mass manufacture successively of uniform density circular rayon fiber filter bodies which comprises the steps of (1) impregnating with thermosetting resin a mass of uniform diameter rayon fibers having predetermined fiber lengths and forming a resin coating on the fibers, (2) separating out of said mass a charge of fibers having a specific fixed weight equal to the weight of one of said bodies, (3) opening up said fibrous charge by application of force to separate the fibers from each other, (4) feeding the charge of fibers into a cylindrical mold with a substantially uniform circumferential distribution of the fibers around the inside wall of the mold, (5) compressing the fibrous charge from opposite longitudinal directions while confining it radially to form a body having a specific fixed shape and size, and (6) heating the body while in compressed condition to cure the resin and bond the fibers to each other and render said body substantially rigid.

8. In an apparatus for use in the manufacture of molded fibrous articles, a mold having an axial dimension, a premold housing axially alignable with said mold, said mold and premold housings approximating the same cross-sectional shape at right angles to said axial dimension, means for blowing a loose charge of air-entrained fibers into said premold housing, apertured portions in at least a section ofsaid premold housing, said apertured portions being so distributed as to cause said air-entrained fibers to collect on the inner surface of said premold housing with substantially even distribution in a circumferential direction in any radial plane passing therethrough, and a ram slidable in said premold housing for forcing said distributed fibers from said premold housing in an axial direction into said mold.

9. In an apparatus for use in the manufacture of molded fibrous articles, a premold cylinder having an apertured section and a solid section, a duct connected to said solid section, the connection between said duct and solid section being offset from and inclined with respect to the cylinder axis so that a loose charge of air-entrained fibers blown into said solid section from said duct will be carried with a spiraling motion toward said apertured section, the distribution of said apertures in said apertured section being such that the fibers will collect on the inner wall of said apertured section with substantially even distribution in a circumferential direction, and a ram slidably mounted in said cylinder for forcing said collected fibers in an axial direction from said cylinder.

10. In an apparatus for use in the manufacture of molded fibrous articles, a premold cylinder assembly comprising an elongated annular cylinder having a solid section and an apertured section in axially contiguous relation, a core within said cylinder forming an annular chamber therewith, a ram slidably mounted in said chamber for movement between the outer end of said solid section and the outer end of said apertured section, a duct connected to said chamber at said solid section, the connection between said duct and solid section being inclined with respect to and offset from the cylinder axis so that a loose charge of air-entrained fibers blown from said duct will move toward said apertured section with a swirling motion, a plurality of apertured portions in said apertured section, the total area of said apertured portions being such as to permit free outward flow of the air introduced from said duct, the arrangement of said apertured portions being such that said air-entrained fibers will collect on the inner surface of said apertured section with substantially even distribution in a circumferential direction, and a closure member at the outer end of said apertured section.

11. The combination according to claim 10, further provided with an actuating piston and cylinder for said ram mounted on the outer end of said solid section.

12. The combination according to claim 10, further provided with means in said duct for causing air-entrained fibers to blow toward said solid section, said last-mentioned means comprising a ring in an intermediate portion of said duct with apertured portions pointing toward said solid section, and means for supplying compressed air to said ring.

13. The combination according to claim 12, further provided with a compressed air nozzle within the duct between said ring and said solid section and pointing toward said solid section.

14. The combination according to claim 10, said apertured portions comprising slots of a dimension sufficiently small to prevent escape of fibers therethrough.

15. The combination according to claim 10, the connection between said duct and said solid section comprising a duct exit of elongated shape in the direction of the premold cylinder axis, the outer wall of said exit being substantially tangential to said solid section, the inner wall of said exit being substantially aligned with the axis of said premold cylinder.

16. In an apparatus for use in conjunction with the manufacture of molded fibrous articles, a set of charge opening rollers comprising at least two pairs of rollers in tandem between which a charge of fibers may be fed, means for rotating the first pair of rollers engaging the charge at a relatively slow speed and the succeeding pair of rollers at a substantially higher speed, whereby the charge of fibers will be torn into small clumps between said rollers, a duct leading from said opening rollers, means for causing the fibers entering said duct to be entrained in air and carried therealong, a premold cylinder having a solid section and an apertured section in axially contiguous relation, a duct exit connected to said solid section, said duct exit being offset from and inclined with respect to the cylinder axis whereby the fibers entering said cylinder will be carried with a swirling motion toward said apertured section, apertured portions in said apertured section having a total area sufficiently great to permit the escape of the air entering said cylinder from said duct, said apertured portions being sufficiently small to prevent escape of fibers and being distributed around said apertured section so that fibers will collect on the inner surface thereof with a substantially even distribution in a circumferential direction, and a ram slidably mounted in said cylinder for movement between the outer end of said solid section and the outer end of said apertured section.

17. In an apparatus for the manufacture of molded fibrous articles, a turntable having a plurality of circumferentially spaced molds arranged in an inner row and an outer row, at least two stationary premold cylinders, means for indexing said turntable so that the molds in said inner and outer rows will be alternately aligned with said premold cylinders, each of said premold cylinders having a solid section and an apertured section in axially contiguous relation, said apertured section being between said solid section and said mold when a mold and cylinder are aligned, closure means reciprocable between a first position closing one of said premold cylinders and opening the other at the outer ends of said apertured portions, and a second position opening said one cylinder and closing said other, a duct connected to the solid section of each cylinder in offset and inclined fashion with respect to the cylinder axis whereby a loose air-entrained charge of fibers blown from said duct into said solid section would be carried with a swirling motion toward said apertured section, apertured portions in said apertured sections so arranged that said swirling fibers will be collected on the inner surface of each apertured section with a substantially even distribution in a circumferential direction, and a ram slidably mounted in each cylinder and movable from a position at the outer end of said solid section to a position at the outer end of said apertured section whereby said collected fibers will be forced into a mold aligned therewith.

18. The combination according to claim 17, the total area of said apertured portions being at least as great as the area of said ram.

19. The combination according to claim 17, further provided with a reciprocable actuating piston mounted at the outer end of the solid section of each of said cylinders and connected to said ram.

20. The combination according to claim 17, further provided with separate means coacting with each duct at the entrance thereof for receiving a charge of fibers, tearing said charge into small clumps, and feeding said clumps into said duct.

21. The combination according to claim 17, further provided with a central core extending through the solid and apertured sections of each premold cylinder and forming an annular chamber therewith, said ram being of annular shape and disposed within said chamber.

22. The combination according to claim 21, each of said molds having a core, and coacting means at the adjacent ends of said cores for aligning said molds with said premold cylinders.

23. The combination according to claim 17, said cylinder closure means comprising a slidable plate mounted at the outer ends of said apertured sections, an apertured portion in said slidable plate, and a reciprocable motor for shifting said plate between said positions.

24. In an apparatus for the manufacture of molded fibrous articles, a mold comprising a cylinder with an open end and a closed end, a mold ram slidably mounted within said cylinder for movement between a retracted position adjacent said closed end and a compressing position adjacent said open end, a closure member for said mold movable between open and closed positions, a premold cylinder having a slightly greater internal diameter than the internal diameter of said mold, means for relatively aligning said mold and premold cylinder, the premold cylinder having an apertured section and a solid section in axially contiguous relation with the apertured section being disposed between the solid section and the mold, a duct connected to said solid section with an inclined offset position with respect to the premold cylinder axis such that a loose air-entrained charge of fibers blown from said duct into said solid section will be carried with a swirling motion to said apertured section, a premold ram slidably mounted in said premold cylinder, means for moving said premold ram from the outer end of said solid section to the outer end of said apertured section and into said mold when said mold ram is in its retracted position a distance sufficient to only partially compress said fibers to the final axial dimension of the article to be formed, means for retracting said premold ram and moving said mold closure member to its closed position, and means for moving said mold ram to its compressing position to compress said fibers to the final axial dimension of the article to be formed.

25. The combination according to claim 24, further provided with central cores in said mold and premold cylinders respectively, the diameter of said mold core being slightly smaller than the diameter of said premold core.

26. The combination according to claim 25, further provided with reciprocable means carried by said premold core and engageable with said mold core to align the mold and premold cylinders.

27. In an apparatus for use in the manufacture of molded fibrous articles, a mold having a cylinder and central core, a premold cylinder alignable with said mold and having a central core, the mold core diameter being slightly less than the premold core diameter, the internal mold cylinder diameter being slightly greater than the internal premold cylinder diameter, means for blowing a loose charge of air-entrained fibers into said premold cylinder, apertured portions in at least a section of said premold cylinder so distributed as to cause said fibers to collect on the inner surface thereof, and a ram for forcing said distributed fibers from said premold cylinder into said mold.

References Cited

UNITED STATES PATENTS

| | | | |
|---|---|---|---|
| 2,571,334 | 10/1961 | Browne | 264—109 |
| 2,997,739 | 8/1961 | Smith et al. | 18—6 |
| 3,004,878 | 10/1961 | Tomlinson | 264—116 |
| 3,098,297 | 7/1963 | De Boer | 18—20 |
| 3,102,835 | 9/1963 | White | 264—109 |
| 3,129,464 | 4/1964 | Heider | 18—20 |
| 3,209,406 | 10/1965 | Hopkins et al. | 18—20 |

FOREIGN PATENTS

| | | | |
|---|---|---|---|
| 851,363 | 10/1960 | Great Britain | 264—116 |

D. J. ARNOLD, *Primary Examiner.*

ALEXANDER H. BRODMERKEL, *Examiner.*

P. E. ANDERSON, *Assistant Examiner.*